Aug. 30, 1966  D. J. DEAN  3,269,260
ELECTRICALLY OPERATED VISUAL INDICATOR DEVICES
Filed Sept. 28, 1964                                    2 Sheets-Sheet 1
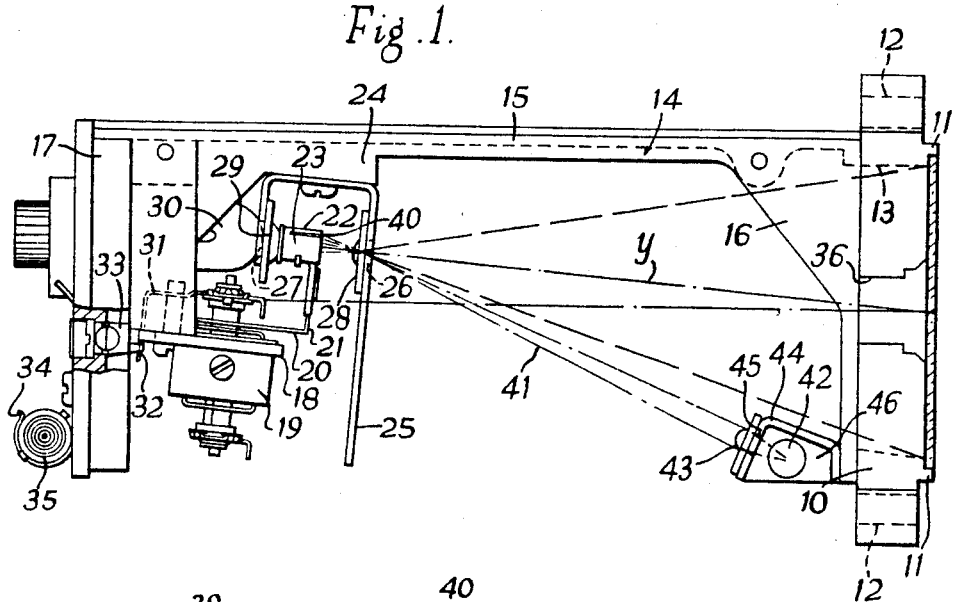
Fig. 1.
Fig. 3.
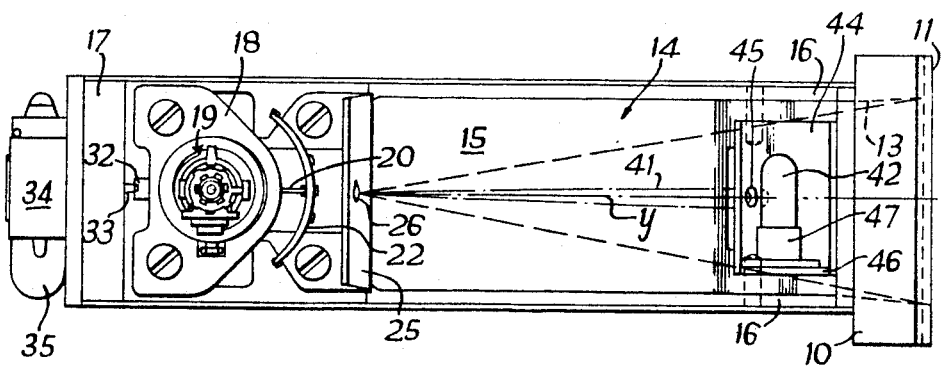
Fig. 2.
INVENTOR
Derek John Dean,
BY
Brown, Jackson, Butcher & Brown
ATTORNEYS

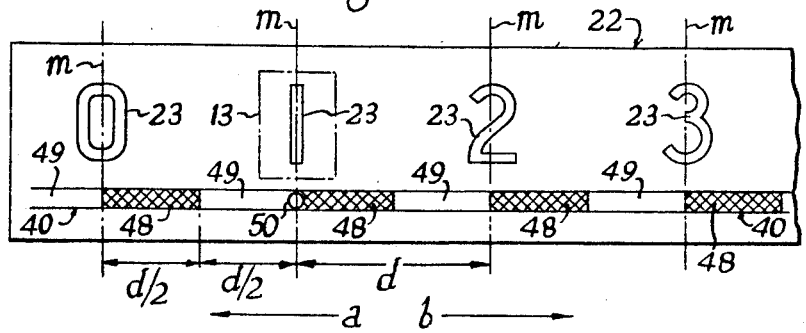
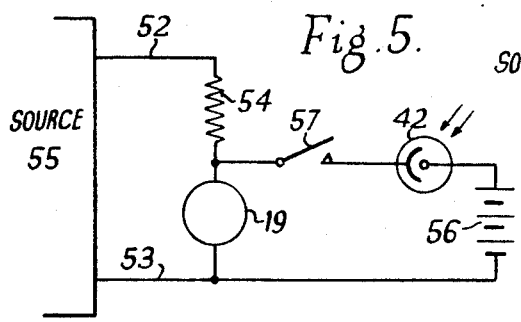
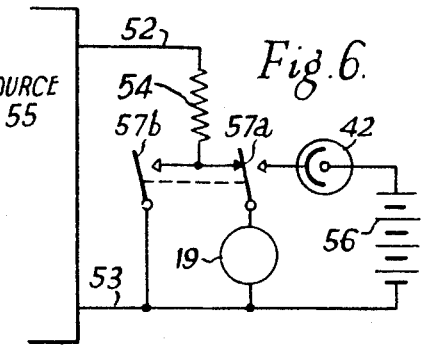
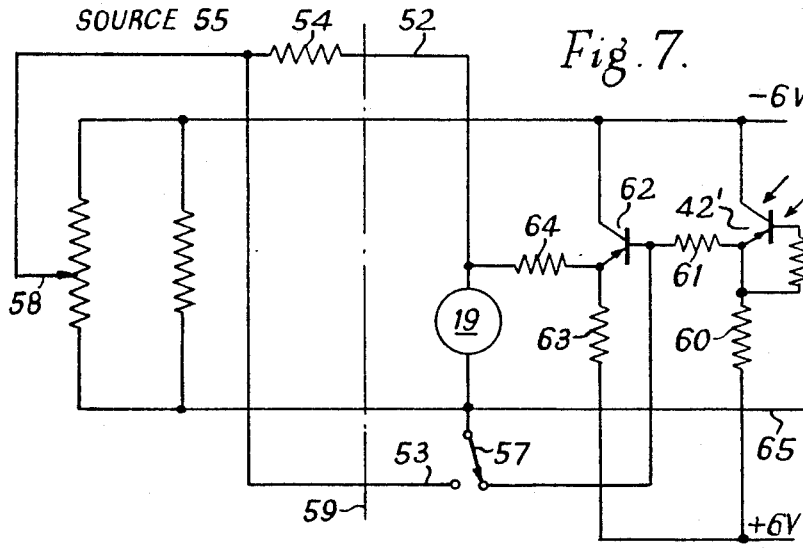
INVENTOR
Derek John Dean
BY
Brown, Jackson, Boettcher & Dienner
ATTORNEYS

United States Patent Office 3,269,260
Patented August 30, 1966

3,269,260
ELECTRICALLY OPERATED VISUAL INDICATOR DEVICES
Derek John Dean, Middlesex, England, assignor to Sangamo Electric Company, Springfield, Ill., a corporation of Delaware
Filed Sept. 28, 1964, Ser. No. 399,580
Claims priority, application Great Britain, Oct. 1, 1963,
38,659/63
10 Claims. (Cl. 88—24)

This invention relates to electrically operated visual indicating or display devices and more particularly to devices of the kind in which any chosen one of a number of different images, such as numerals, alphabetical characters or like symbols, carried by a projection strip which is coupled to and moved by motor means such as a moving coil electrical instrument movement, may be optically projected on to a viewing screen by the application of a suitable control current to the said motor means. Examples of such a device are described in British Patent No. 919,057.

Since, in the operation of such devices, the position of the projection strip with relation to the optical projection system and hence the position of the usually greatly magnified projected image upon the viewing screen is determined by the instantaneous value of the control current applied to the motor means, e.g. to the moving coil winding of the instrument movement, any variation in the latter, however slight, from the particular value required to position the chosen projected image accurately upon the viewing screen will cause such image to become displaced from its proper position. If the applied control current includes any rapidly fluctuating component such as superimposed alternating current or sporadic switching or noise impulses the projected image may become blurred. Furthermore it is clearly not possible to maintain projection of any one character image whilst the applied control current is being altered to some other value related to the projection of a different one of the available series.

One object of the invention is the provision of an improved arrangement by means of which accurate registration of the position of any projected image within a chosen area of the viewing screen may be obtained in spite of any variation, either intermittent or continuous, of the control current from the particular value which is correct for causing projection of the chosen image.

Another object of the invention is the provision of an arrangement by means of which projection of any chosen one of the series of available images may be maintained whilst the control current, which is usually in the form of a stepped amplitude of "staircase" waveform current, is being altered, e.g. from the value previously used to initiate projection of the currently displayed image to the value necessary to cause display of the next required image.

Broadly in accordance with this invention, the projection strip which carries the series of different images available for projection is also provided with an optical record track located in the path of a light beam from a light source on to a photocell or equivalent light sensitive means, such optical record track, which will hereinafter be called the holding track, having variations of its optical density at positions therein which are related to the correct projection positions of the strip for the different available images thereon and which are of such form that the output from the photocell or equivalent means provides a current which is suitable for application, either directly or by way of suitable amplifier means, to the aforesaid motor means to correct any position error of the projected image and/or to hold any currently projected image in its correct projection position whilst the normal control current is altered in value or is even entirely removed.

In order that the nature of this invention may be properly and readily understood, embodiments thereof will now be described by way of illustrative example only and with reference to the accompanying drawings, in which:

FIGURE 1 is a side elevational view of one form of the invention as applied to a digital read-out device for a computer or electrical measuring instrument such as a digital voltmeter;

FIGURE 2 is an underside plan view of the device shown in FIGURE 1;

FIGURE 3 is a schematic drawing illustrating the essential elements of the invention as applied to a device of the type shown in FIGURES 1 and 2;

FIGURE 4 is an elevational view, drawn to an enlarged scale, of a portion of the projection strip of the device of FIGURES 1–3;

FIGURE 5 is a circuit diagram of one, simplified, position control arrangement;

FIGURE 6 is a circuit diagram of another position control arrangement; while

FIGURE 7 is a circuit diagram of a preferred form of position control arrangement utilising a device as shown in FIGURES 1–4.

Referring first to FIGS. 1 and 2, the digital read-out device shown comprises a front mounting plate 10 provided on its forward facing surface with two spaced-apart horizontal ribs 11 for receiving and supporting therebetween a translucent screen plates 38 (FIG. 3). Such screen plate is conveniently made of acrylic resin material such as that known under the trademark "Perspex" and is preferably provided on one surface with a ground or matt surface finish.

The mounting plate 10 is provided with a pair of spaced holes 12 therethrough for the purpose of mounting the device upon the rear or the front surface of a panel or like support and is also formed with a central viewing aperture 13 of approximately rectangular shape. This plate 10 is secured to or, more preferably, is formed integrally with the forward end of a framework 14 which is preferably of moulded or die-cast metal and has a main, rearwardly extending and horizontal upper limb 15 and a pair of downwardly extending front arms 16 (FIG. 2) positioned one on each side of the viewing aperture 13. To the rear end of the upper limb 15 is secured a mounting member in the form of a block 17. This block member is preferably made of electric insulating material and is conveniently of moulded form.

To the mounting block 17 is secured a metal mounting plate 18 forming a forwardly directed and slightly inclined platform carrying secured thereto a moving coil type instrument movement 19 of any convenient form including one or more control springs for restoring the moving coil system thereof to one end of its permissible range of angular movement. The instrument is preferably of small physical size. This movement is disposed with its moving coil pivotation axis normal to the plane of the plate 18, i.e. slightly inclined in a forward direction, while to the moving coil there is secured, in place of the more usual pointer arm, a radially extending scale carrier arm 20. This arm 20 is preferably of aluminium and has an upwardly directed forward end 21 to which is secured an arcuate scale strip 22 whose centre of curvature coincides with the pivotation axis of the moving coil of the instrument. The scale plate carries thereon in a linear row and in suitably spaced relationship the group of character or other images 23 which are to be displayed, for example, the digits 0, 1, 2 . . . 9. The strip 22 is preferably opaque except for the display images which are transparent but the alternative of opaque images upon a transparent strip may be used if desired. Such scale strip with its display images is preferably formed by a photographic method.

A mounting block 24 projects downwardly from and forms part of the upper limb 15 of the framework 14 at its rearward end and to this is secured an inverted U-shaped member 25 of sheet metal having aligned apertures 26, 27 in its respective forward and rearward limbs. On the rearward surface of the forward limb of the member 25 and in register with the aperture 26 therein is mounted a projection lens 28 of plano-convex form and preferably formed by moulding in acrylic resin such as that known under the trademark "Perspex" while on the forward surface of the rearward limb of the same member 25 and in register with the aperture 27 therein is mounted a condenser lens 29 preferably also of moulded acrylic resin and of plano-convex form. The optical axis of the two lens passes through the centre line of the row of images 23 of the scale strip 22 and the centre point of the viewing aperture 13 so that as the scale strip is moved by the motor means constituted by the instrument movement 19 any of the images carried by the projection strip may be displaced upon the screen plate 38 within the area of the aperture 13.

Behind the condenser lens 29 is disposed a light source in the form of a small incandescent electric lamp bulb 30 carried in a suitable holder mounted in the block 17. The bulb is made readily removable in a rearward direction. The instrument movement includes the usual zero adjuster system 31 comprising a downwardly directed slotted arm 32. The slot in this arm is engaged by an eccentric pin carried in the forwardly facing end of a rotatably zero adjuster stud 33 mounted in the block 17 and having its rearward end accessible from the rearward side of the latter.

A sheet metal protective cover of U-shape in transverse cross-section, although not shown, is provided to cover the two vertical sides and the lower horizontal side of the space between the front plate 10 and the rear mounting block 17. Suitable sealing means, such as a foam rubber strip, is preferably provided along the various edges to seal the interior against the ingress of dirt and other foreign matter. The mounting block 17 is conveniently provided with a clip 34 for storing a spare lamp bulb 35.

In the operation of the already known construction so far described, the application of different values of current to the instrument movement 19 will result in the deflection of the moving coil system against the action of its restoring spring and a corresponding angular movement of the scale strip from its normal resting position thereby to move the different images on the projection strip through the light beam between the two lenses 28, 29. By appropriate choice of the value of the applied current, any one of the series of images may be brought into alignment with the light beam and consequently projected on the viewing screen of the plate 38 and thus displayed to external view. For example, if the series of images comprise the digits 0, 1 . . . 9, by applying suitably different values of current to the instrument movement 19 any one of such digits may be displayed on the screen plate. The digit "0" may coincide with the initial or rest position of the moving coil system or require a specific value of applied current to cause its display. A multi-step or so-called "staircase" current waveform is usually made available in apparatus employing devices of the kind described, the amplitude level of each step being that appropriate to cause display of a different one of the available series of character or other images.

As already mentioned, any variation of the current applied to the instrument movement, such as by reason of a fluctuation in a basic power supply or variation due to incipient fault or ageing of a circuit component or due to the superimposition upon the applied circuit of some other interfering current such as a power supply ripple component, from the precise value necessary to bring the chosen image to the position where it is correctly displayed in register with the central area of the screen plate 38 will result in lateral displacement of the displayed image to one side or the other and, in the case of a superimposed fluctuating component, the relatively rapid backward and forward movement of the image to cause a defective blurred display.

Referring now also to FIGS. 3 and 4, the improvements of the present invention reside in the provision on the scale strip 22 of a separate holding track 40 of varying optical density parallel with and to one side of the row of display images 23 and the provision of a further light beam 41 which is directed through a small discrete region of this holding track 40 on to a photocell or equivalent photosensitive device 42.

The further light beam 41 conveniently comprises a small bundle of the light rays already available from the light source 30 through the respective condenser and projection lens 29, 28 and which have passed through a small area portion of the holding track 40 which is in vertical alignment with the related image-bearing region directed on to the screen plate 38. Such further beam 41 is directed into a condenser lens 43, conveniently of the same form as the lens 28, 29, which lens 43 is mounted on one face of a generally U-shaped supporting bracket 44 secured to the rearward surface of the front mounting plate 10 near its bottom edge. Such bracket 44 is provided with an aperture 45 in register with the optical axis of the lens 43 while on an integral side flange 46 of the bracket there is mounted holder means 47 (FIG. 2) for the photocell 42. The latter is, of course, so positioned that light emerging through the aperture 45 is directed through the light entry area or window of the photocell. Such photocell may be of any suitable and convenient form such as a cadmium-sulphide cell but is preferably a photo-transistor.

The preferred form of the holding track 40 is shown more clearly in FIG. 4 and consists of a series of optically opaque blocks 48 separated by optically transparent areas 49 arranged in a linear row parallel with the row of images 23. Each block 48 and area 49 is preferably of a length $d/2$ equal to one half of the spacing distance $d$ between each adjacent pair of images while the vertical dimension of each opaque block is at least equal to and preferably greater than the diameter of the second light beam 41 at the position where it impinges upon the scale strip 22 (as indicated by the dotted circle 50). With the disposition of the axis of the light beam 41 in the same vertical plane as the main projection beam axis $y$ (FIGS. 1 and 2) the lines of juncture between a light transmitting area 49 and an opaque block 48 with the strip 22 moving in the "up-scale" direction of the arrow $a$ occur in alignment with the centre or median line $m$ of each image. In FIG. 4, the scale strip and its images are shown inverted from the true position which they occupy when mounted on the carrier arm 20, the necessary erection being then due to the optical system.

If now the current output from the photocell 42, greatest when the cell is illuminated, is applied by suitable circuit means to the movable coil winding of the instrument movement 19 instead of the control current normally applied thereto by way of terminals 51 (FIG. 3) and in the sense to move the projection strip 22 in the "up-scale" direction of the arrow $a$ (FIG. 4) against the force of the normal restoring spring means which operate in the direction of arrow $b$, then if the strip is in some way positioned, e.g. mechanically, with any one of the character images 23 approximately in register with the viewing area of the screen plate 38, then the output of the photocell will cause the strip to move to the position where the cell output obtained by the illumination thereof by the portion of the beam 41 passing through the transparent area 49 of the holding track 40 lying in the beam region 50 is sufficient just to balance the torque of the restoring spring means. Provided the photocell output, when fully illuminated by location of the beam region 50 wholly within a transparent area 49 of the track 40, is large compared with the current needed to effect maximum deflection of the moving coil against the force of its restoring spring means, and provided the transition between the opaque or light blocking zones 48 and the light transmitting areas 49 is rapid, the deviation of the balance or holding position from register with the median line *m* for an image 23 at one end of the projection strip 22 need be very little different from that for an image at the opposite end.

Application of the normal control current to the moving coil winding of the instrument movement 19, in addition to the holding current, will be ineffective to change the position of an already displayed character since it will only operate slightly to modify the holding current value drawn from the photocell brought about by a very slight alteration of position of the projection strip 22 and the division ratio between the respective light transmitting and light blocking zone areas embraced by the area 50 of the light beam 41. If, however, the photocell derived holding current is arranged to be switched to the moving coil in addition to the control current after the projection strip has been approximately positioned by such control current to display a given character, then that character will be centralised and held continuously thereafter even if the control current is subsequently altered or even discontinued. If desired, the switching means may be arranged to disconnect the normal control current at or after the instant when the holding current is switched on.

One, simple circuit arrangement for utilising the above-described device is shown in FIG. 5 where the instrument movement 19 is shown supplied by way of leads 52, 53 and series resistance 54 from a suitable source 55 of a variable amplitude direct current. The source 55 may be part of a computer or a digital counting circuit of known form providing a stepped or "staircase" waveform. The photocell 42 is shown connected in series with a source 56 of direct current, e.g. a battery, and a holding control switch 57 directly across the instrument movement 19. With the switch 57 open, as shown, the control current from the source 55 is alone effective to control the position of the projection strip 22 of the instrument movement 19 and hence will determine the image which is displayed. Closure of switch 57 serves to apply holding current at a value determined by the degree of illumination of the photocell 42 and, as explained above, results in centralisation of whichever image was already being displayed and the subsequent holding of that image regardless of any change in value of the current value available from the source 55.

FIGURE 6 shows a modified circuit arrangement designed to isolate the display device from influence by the variable control current during the holding periods. In this arrangement, the instrument movement 19 is connected to the common movable contact of a change-over switch 57a which normally completes a circuit to the input current source 55 through resistance 54 but which, when reversed, opens such input circuit and closes the holding circuit through the photocell 42 and current source 56. It is desirable that the switch operation should be of the "make before break" form in order to ensure against any return movement of the moving coil of the movement 19 during the transition period of the switching operation. If it is desirable to maintain a completed load circuit for the input source 55 during the holding period, this may be provided by way of at linked second section 57b of the switch 57.

The switching means 57 of 57a, 57b may be manually operated switch devices or be constituted by relay or other electromagnetic switching means; alternatively electronic switch means forming part of or controlled by the circuitry of the input source 55 with which the visual display device is associated may be employed.

Further improvement in performance is obtainable if the holding current derived from the photocell 42 is capable of either opposing or aiding the restoring spring torque effective on the moving coil of the movement 19 according to the sense of deviation of the displayed image from correct position and the consequent altered illumination of such cell.

One circuit arrangement for this purpose is shown in FIG. 7 where the potentiometer 58 and other circuit components shown to the left of the line 59 represent the source 55 of variable amplitude control current such as that provided by a digital counter circuit. As in FIGS. 5 and 6, reference 57 indicates the holding control switch which is shown in the "free operation" or non-holding position while the photocell 42 takes the form of a photo-transistor 42' having a load resistor 60 and connected across current supply leads −6 v. and +6 v. The photo-transistor output is coupled by way of resistor 61 to the base of a further transistor 62 whose emitter is connected by way of resistor 63 to the supply lead +6 v. and by way of resistor 64 to the non-earthed side of the instrument movement 19.

With the holding control switch 57 in the "free operation" position shown, the variable amplitude current from the potentiometer 58 is fed wholly to the instrument movement 19 whilst any current at the base of the transistor 62 as a result of illumination of the photo-transistor 42 is diverted direct to the common earth line 65. Upon reversal of the switch 57, the transistor 62 now supplies holding current by way of resistor 64 to the instrument movement 19 at an amplitude which is dependent upon the illumination of the photo-transistor 42 while the original control current from the source 55 is diverted to the common line 65. Since the point *x* is capable of being at a potential which is either positive or negative with respect to the common line 65, the current to the instrument movement 19 may be such as will either aid or oppose the restoring spring torque of the moving coil.

While one specific device construction and three particular circuit arrangements have been described, it will be understood that many modifications may be made without departing from the scope of the invention as defined in the appended claims.

I claim:

1. An electrically operated visual indicating device which includes a fixed position light source, a display screen, a movable image bearing strip having a plurality of separate images thereon, a first optical projection system arranged to project any one of said images on to said display screen by illumination from said light source, a moving coil type instrument movement for moving said projection strip relative to said optical projection system to cause projection of any chosen one of said images on to said display screen and first circuit means for applying an operating current to said instrument movement and which also comprises a light responsive unit, an optical record track on said projection strip, said track including for each image thereon a region having sharply defined light obstructing and light transmitting portions, a second optical projection system for directing a beam of light from said light source through said record track on to said light responsive unit and second circuit means including change-over switch means for applying a centralizing current derived from the output of said light responsive unit to control the operation of said instrument movement instead of said operating current.

2. An electrically operated visual indicating device which comprises a fixed supporting framework, a translucent screen plate mounted on said framework, a single wound moving coil instrument movement secured to said framework, an arcuate projection strip carried by the moving element of said instrument movement, said projection strip having a linear row of different images thereon, a light source mounted on said framework, first optical projection lens means mounted on said framework and arranged to direct a beam of light from said light source through said projection strip onto said screen plate to produce an enlarged version of any one of such images on said screen plate, a separate holding track comprising alternate transparent and opaque regions on said projection strip, there being one pair of such alternate regions for each of said images, a single photocell mounted on said framework, second optical projection lens means for directing a separate light beam from said light source through a restricted area of said holding track on to said photocell, circuit means including a holding control switch for applying the output of said single photocell to said moving coil instrument movement, and restoring spring means continuously tending to restore said moving coil instrument movement to normal position.

3. An electrically operated visual indicating device which comprises a fixed supporting framework, a translucent screen plate mounted at one end of said framework, a moving coil instrument movement secured to the opposite end of said framework, an arcuate projection strip carried by the moving element of said instrument movement, said projection strip having an opaque body with a linear row of different transparent images thereon, a light source mounted on said framework adjacent the centre of said arcuate projection strip, first optical projection lens means mounted on said framework and arranged to direct a beam of light from said light source through said projection strip onto said screen plate to produce an enlarged version of any one of such images on said screen plate, first circuit means for applying operating current to said instrument movement, a separate holding track comprising alternate transparent and opaque regions on said projection strip there being one pair of such alternate regions for each of said images, a phototransistor mounted on said framework adjacent said screen plate, second optical projection lens means for directing a separate light beam from said light source through a restricted area of said holding track on to said phototransistor photocell and a transistor included in said second circuit means for applying the output of said phototransistor to said moving coil instrument movement.

4. An electrically operated visual indicating device which comprises a fixed supporting framework, a translucent screen plate mounted on said framework, a moving coil instrument movement secured to said framework, an arcuate projection strip carried by the moving element of said instrument movement, said projection strip having a linear row of different images thereon, a light source mounted on said framework, first optical projection lens means mounted on said framework and arranged to direct a beam of light from said light source through said projection strip onto said screen plate to produce an enlarged version of any one of such images on said screen plate, first circuit means for applying operating current to said instrument movement to align a chosen one of said images with said projection beam a separate holding track comprising alternate transparent and opaque regions on said projection strip, there being one pair of such alternate regions for each of said images with the line of demarcation between the respective transparent and opaque regions in centered positional relationship to the related image, a single photocell mounted on said framework, second optical projection means for directing a separate small cross-section light beam from said light source through a restricted area of said holding track on to said single photocell and second circuit means including a holding control switch for applying the output of said single photocell to said moving coil instrument movement and operative in another position to disconnect the output of said photocell from said moving coil instrument movement.

5. The combination of claim 1, which is further characterized by the provision of control spring means which normally tends to restore said moving coil type instrument movement to one end of its permissible range of movement.

6. The combination of claim 2 which is further characterized by the provision of control spring means which normally tends to restore said moving coil instrument movement to one end of its permissible range of angular movement.

7. The combination of claim 4 which is further characterized by the provision of control spring means which normally tends to restore said moving coil instrument movement to one end of its permissible range of angular movement.

8. The combination of claim 1 wherein said centralizing current is operable to exert more torque on said instrument movement when in operation than said operating current.

9. In apparatus of the class described, the combination of a supporting framework, a light source and a display screen carried thereby, a movable image bearing strip having a plurality of separate images thereon, an optical projection system arranged to project any one of said images on to said display screen by illumination from said light source, an optical control system associated with said optical projection system comprising an optical control track of alternate opaque and transparent sections, an electric motor operative to drive said image bearing strip and said optical control track simultaneously in one direction, restoring spring means operative to exert a reverse torque on said image bearing strip and said control track to cause reverse drive thereof when permitted to do so by the torque of said electric motor, a single light sensitive photocell adapted to respond to light rays which can pass through said control track, one pair of alternate opaque and transparent sections being related to each of said projectable images in said projection system, and that one junction between a transparent and opaque section interferes with the light beam to said single photocell when the displayed character or image is properly centralized in the sense to develop a control current from said single photocell which increases as the moving system with its associated character display images moves in the direction of the constantly applied control torque exerted by said spring means.

10. An electrically operated visual indicating device which includes a fixed position light source, a display screen, a movable image bearing strip having a plurality of separate images thereon, a first optical projection system arranged to project any one of said images on to said display screen by illumination from said light source, a moving coil type instrument movement for moving said projection strip relative to said optical projection system to cause projection of any chosen one of said images on to said display screen, a first circuit means for applying an operating current to said instrument movement, a photocell, an optical record track on said projection strip, said track including for each image thereon a region having sharply defined light obstructing and light transmitting portions, a second optical projection system for directing a beam of light from said light source through said record track on to said photocell, a source of current, a holding circuit connecting said photocell and said source of current together, and make-before-break switch means operative to connect said instrument movement to said holding circuit before disconnecting it from said first circuit.

References Cited by the Examiner

UNITED STATES PATENTS

| 3,144,637 | 8/1964 | Adams et al. | 346—108 X |
| 3,144,807 | 8/1964 | Coombs | 346—109 |

FOREIGN PATENTS

| 678,917 | 7/1939 | Germany. |

OTHER REFERENCES

Gossen, German printed application No. 1,098,219, pub. Jan. 26, 1961 (2 pages spec., 1 sht. dwg.) (KL. 42d 1/15).

NORTON ANSHER, *Primary Examiner.*

H. H. FLANDERS, *Assistant Examiner.*